(12) United States Patent
Gibson et al.

(10) Patent No.: US 9,691,048 B1
(45) Date of Patent: Jun. 27, 2017

(54) PHOTOCONDUCTIVE MULTI-RESONATOR CHIPLESS RFID

(71) Applicant: XEROX CORPORATION, Norwalk, CT (US)

(72) Inventors: George A. Gibson, Fairport, NY (US); James R. Larson, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/979,326

(22) Filed: Dec. 22, 2015

(51) Int. Cl.
G06K 19/00 (2006.01)
G06Q 10/08 (2012.01)
G06K 19/07 (2006.01)

(52) U.S. Cl.
CPC ....... G06Q 10/087 (2013.01); G06K 19/0723 (2013.01)

(58) Field of Classification Search
USPC ................................................ 235/487, 492
See application file for complete search history.

(56) References Cited

U.S. PATENT DOCUMENTS

| | | | |
|---|---|---|---|
| 4,233,383 A | 11/1980 | Horgan | |
| 4,363,711 A * | 12/1982 | Kuehnle | G03G 5/082 204/192.12 |
| 5,861,809 A | 1/1999 | Eckstein et al. | |
| 7,653,982 B2 | 2/2010 | Chopra et al. | |
| 2005/0179548 A1 | 8/2005 | Kittel et al. | |
| 2008/0218352 A1 | 9/2008 | Miles et al. | |
| 2008/0224871 A1 * | 9/2008 | Bolotin | G06K 19/07749 340/572.1 |
| 2009/0231139 A1 | 9/2009 | Heurtier | |
| 2009/0301382 A1 | 12/2009 | Patel | |
| 2013/0285477 A1 * | 10/2013 | Lo | H02J 17/00 307/151 |
| 2016/0358058 A1 | 12/2016 | Gibson et al. | |

FOREIGN PATENT DOCUMENTS

| | | | |
|---|---|---|---|
| AU | WO 2015061827 A1 * | 5/2015 | .......... H01Q 1/2225 |
| CN | 202650044 | 1/2013 | |
| EP | 1218771 B1 | 12/2004 | |
| FR | 2992758 A1 | 3/2014 | |

(Continued)

OTHER PUBLICATIONS

Preradovic et al., "Multiresonator-Based Chipless RFID System for Low-Cost Item Tracking," IEEE Transactions on Microwave Theory and Techniques, vol. 57, No. 5, May 2009, pp. 1411-1419.

(Continued)

*Primary Examiner* — Matthew Mikels
(74) *Attorney, Agent, or Firm* — MH2 Technology Law Group LLP (57) ABSTRACT

A chipless RFID transponder is disclosed. The transponder comprises an antenna and a plurality of resonant structures that together define a spectral signature of the RFID transponder. Each of the resonant structures comprises conductive portions separated by interstitial regions. A reversible photoconductive material is disposed in the interstitial regions of the resonant structures between the conductive portions. The photoconductive material is positioned so as to shift the spectral signature of the RFID when exposed to radiation.

20 Claims, 4 Drawing Sheets

(56) References Cited

FOREIGN PATENT DOCUMENTS

WO     WO 2009/126999 A1    10/2009
WO     WO 2015/061827 A1     5/2015

OTHER PUBLICATIONS

Gibson et al., "Printing System Architecture for Encoding Chip-Less RFID Tags in Real Time," U.S. Appl. No. 14/733,536, filed Jun. 8, 2015.
Author Unknown, "Photoresistor," from Wikipedia, https://en.wikipedia.org/wiki/Photoresistor, Dec. 3, 2015, 3 pages.
Author Unknown, "Chalcogenide," from Wikipedia, https://en.wikipedia.org/wiki/Chalcogenide, printed Feb. 6, 2017, 4 pages.

\* cited by examiner

PHOTOCONDUCTIVE MULTI-RESONATOR CHIPLESS RFID

TECHNICAL FIELD

Embodiments described herein relate generally to photoconductive chipless radio frequency identification (RFID) tags.

BACKGROUND

Radio frequency identification (RFID) technology has gained tremendous popularity as a device for storing and transmitting information. RFID technology utilizes a tag transponder, which is placed on an object, and a reader, also referred to herein as an interrogator, to read and identify the tag. RFID technologies are broadly categorized as using either "active" tags or "passive" tags. Active tags have a local power source (such as a battery) so that the active tag sends a signal to be read by the interrogator. Active tags have a longer signal range. "Passive" tags, in contrast, have no internal power source. Instead, passive tags derive power from the reader, and the passive tag re-transmits or transponds information upon receiving the signal from the reader. Passive tags have a much shorter signal range (typically less than 20 feet).

Both categories of tags have an electronic circuit that is typically in the form of an integrated circuit or silicon chip. The circuit stores and communicates identification data to the reader. In addition to the chip, the tag includes some form of antenna that is electrically connected to the chip. Active tags incorporate an antenna that communicates with the reader from the tag's own power source. For passive tags, the antenna acts as a transducer to convert radio frequency (RF) energy originating from the reader to electrical power. The chip then becomes energized and performs the communication function with the reader.

A chipless RFID tag has neither an integrated circuit nor discrete electronic components, such as the transistor or coil. This feature allows chipless RFID tags to be printed directly onto a substrate at lower costs than traditional RFID tags. These devices, which operate in a "read only" mode are entirely passive and rely on the resonances created when patterns of specific length are constructed with conductive materials. The tags are "queried" with a broadband, polarized microwave pulse and the reirradiated signal observed in the orthogonal polarization. The power spectrum of the reirradiated signal show decreases in intensity at those frequencies corresponding to the conductive resonant structure.

Optical sensors can be desirable for a variety of applications. For example, optical sensors can be useful for transporting or storage of goods, such as determining whether perishable goods sensitive to radiation are exposed to an unacceptable amount of radiation during transport or storage. Other applications include sensing radiation exposure of light sensitive documents or other light sensitive objects, such as photographic film.

Remotely queriable optical sensors most generally rely on chipped RFID or near field communication (NFC) technologies coupled with standard optical detection methodologies. This means that, while effective, such sensors are generally expensive, costing several dollars to several tens of dollars apiece, thus limiting the range of applications in which they are used.

Novel techniques for reducing the cost of optical sensors would be considered a welcome advancement in the art.

SUMMARY

An embodiment of the present disclosure is directed to a chipless RFID transponder. The transponder comprises an antenna and a plurality of resonant structures that together define a spectral signature of the RFID transponder. Each of the resonant structures comprises conductive portions separated by interstitial regions. A reversible photoconductive material is disposed in the interstitial regions of the resonant structures between the conductive portions. The photoconductive material is positioned so as to shift the spectral signature of the RFID when exposed to radiation.

Another embodiment of the present disclosure is directed to a method of tracking inventory. The method comprises placing a chipless RFID transponder on an article. The RFID transponder comprises an antenna and a plurality of resonant structures that together define a spectral signature of the RFID transponder. Each of the resonant structures comprise conductive portions separated by interstitial regions. A reversible photoconductive material is disposed in the interstitial regions of the resonant structures between the conductive portions. The photoconductive material is positioned so as to shift the spectral signature of the RFID when exposed to radiation.

The optical sensors of the present disclosure can provide one or more of the following advantages, such as ability to sense exposure of objects to radiation, the ability to sense exposure to radiation in real-time, and relatively low cost of manufacture.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts. It will be understood that the structures depicted in the figures may include additional features not depicted for simplicity, while depicted structures may be removed or modified.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

The term "chipless" as used herein to describe RFID transponders means that the RFID transponder has neither an integrated circuit nor discrete electronic components, such as a transistor or coil.

As used herein, the term "resonant structure" means a structure having an associated resonance corresponding to a characteristic frequency.

As used herein, the term "spectral signature" refers to at least one identifying resonance associated with an applied excitation frequency. The spectral signature may have at least one magnitude component and at least one phase component.

As used herein, the term "tag" refers to a transponder or a combination of a transponder and carrier on which the transponder is disposed.

As used herein, the term "transponder" refers to a device that receives signals, such as those transmitted by an interrogator, and sends signals in response to the received signals.

As used herein, the term "etched" refers to a process by which portions of a material are chemically removed.

As used herein, the term "security overlayer" means a backing layer that when tampered with, damages, destroys or otherwise modifies a structure on which the security overlayer is disposed.

As used herein, the term "generic RFID transponder" means an RFID transponder that has an associated resonant structure for each frequency domain applied by a transmitter, such as an interrogator.

Figure 1:
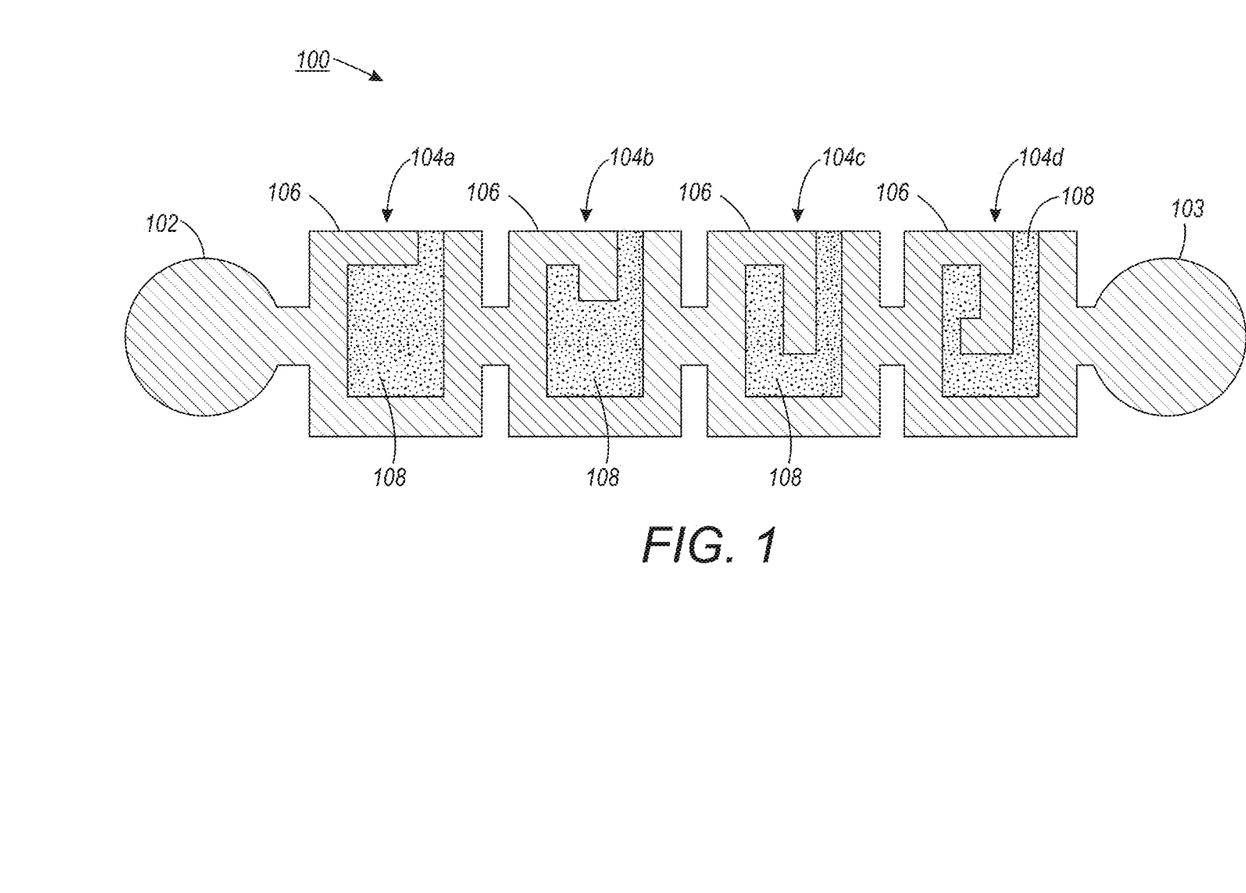
FIG. 1 depicts a top view of a chipless RFID transponder, according to an embodiment of the present disclosure.

FIG. 1 is a view of a chipless RFID transponder 100. RFID transponder 100 includes at least one antenna, such as receiving antenna 102,103 and transmitting antenna 104. Antenna 102 and 103 may be incorporated as part of a circuit that includes a plurality of resonant structures 104a-104d that, together, define a spectral signature of the RFID transponder. For example, each of the plurality of resonant structures 104a-d may exhibit a respective resonance. The resonance is associated with a natural frequency that is dependent upon the corresponding resonant structure's geometry, among other factors. Accordingly, each of the plurality of resonant structures 104a-d may be used for independent encoding of a single bit of information. The resonant structure may be a spiral resonator, such as that shown in FIG. 1, or may be selected from any other resonant structures that can provide the desired resonance effect, such as, but not limited to, parallel traces, meander and fractal shaped resonant structures, all of which are generally well known in the art. Examples of suitable known resonant structures are shown in Patent Publication WO 2009/126999, the disclosure of which publication is herein incorporated by reference in its entirety.

The presence of any one resonant structure 104a-104d, each having a particular resonant frequency, results in a corresponding attenuation at that frequency in the response of the overall RFID transponder 100. Accordingly, the presence or absence of each resonance structure 104a-104d determines the presence or absence of a corresponding resonance having a particular characteristic frequency and phase response, which may be used, for example, to encode one bit of digital information. Each of the plurality of resonant structures 104a-104d comprise a continuous segment of electrically connected material having conductive regions 106. Interstitial regions 107 (FIG. 3A) lie in between portions of the continuous segment of each resonant structure.

The chipless RFID transponder 100 includes a reversible photoconductive material 108 disposed in interstitial regions 107 between the conductive regions 106 (e.g., traces) of the resonant structures. In an embodiment, at least a portion of the photoconductive material is disposed in between and coplanar with the conductive regions 106 of the resonant structure, so that the entire active resonant structure is formed in the same plane. This results in the photoconductive materials being interdigitated among the conductive traces of the resonator structure. This may help increase the resonance effect of the conductivity changes and can result in thinner sensors compared to some other resonator designs.

The photoconductive material 108 has a property of having first conductivity prior to being exposed to radiation at a specified wavelength and a second conductivity that is different from the first conductivity while being exposed to radiation at the specified wavelength. The phrase "specified wavelength" can be any desired wavelength at which the material has been tuned to change conductivity, and may include any wavelength in the electromagnetic spectrum, including, for example, wavelengths in the infrared (e.g., near-, mid- or far-infrared), visible light, and ultra violet light range. In an embodiment, the second conductivity is higher than the first conductivity. For example, the photoconductive material can be an electrical insulator or semiconductor prior to being exposed to radiation and can become more electrically conductive, such as a more conductive semiconductor or an electrically conductive material, when exposed to radiation at a specified wavelength. In another embodiment, a photoconductor that exhibits a decrease in conductivity with exposure to light can be used, so that the second conductivity is lower than the first conductivity. The photoconductive materials 108 are reversible photoconductors, meaning that they change from having first conductivity to a second conductivity when exposed to radiation, but return to the first conductivity after exposure to the radiation ends. Further, the reversible photoconductors are capable of repeatedly cycling between the first conductivity and second conductivity with changing radiation exposure conditions. The degree in the change of conductivity can be any amount that will provide a detectable change in resonance when the transponder is queried.

The photoconductive material is positioned so as to shift the spectral signature of the RFID when exposed to radiation. In particular, the photoconductive material is applied as a filler between portions of the conductive traces that comprise the resonant. Suitable photoconductive fillers increase or decrease conductivity when exposed to radiation. A change in conductivity of the photoconductor 108 can change the resonance, and thus change the reflected signal of the transponder when it is queried. For example, as the conductivity of the filler 108 increases, the associated attenuation of the reflected power spectrum at the wavelength of the reflected signal corresponding to the resonator structure decreases. This effectively allows an increase in radiation intensity impinging on the photoconductive material to reduce the resonance of the resonant structures 104a-d. This can in turn result in a detectable change in the trough associated with the resonance in the reflected power spectrum, thereby indicating exposure to radiation.

Employing technologies well known for the formulation of photoconductor materials, photoconductor materials can be employed that exhibit increasing conductivity with increasing incident light intensity. For example, the change in conductivity with the change in intensity of the light to which the photoconductive material is exposed can be substantially linearly dependent. Alternatively, photoconductors can be used that exhibit a distinct threshold effect. For example, the value of the second conductivity can remain substantially the same as the first conductivity unless the photoconductor is exposed to radiation having a certain threshold intensity.

Any suitable type of inorganic or organic photoconductive materials can be employed. Examples of suitable inorganic photoconductor materials include chalcogenide based photoconductors such as selenium, tellurium, selenium tellurium, zinc oxide, titanium dioxide and arsenic triselenide. Such chalcogenide materials have advantages including: the ability to be formed into a homogeneous structure, which allows these photoconductors to change conductivity isotropically; and ease of deposition, such as by vacuum deposition. Examples of suitable organic photoconductive materials include polymeric photoconductive materials such as those used in the belt structures of modern photo printers and copiers. The polymeric photoconductors can be multi-layered structures that include both a charge generating layer and a charge transport layer. Polymeric photoconductors have certain advantages, such as the ability to be deposited by relatively inexpensive techniques and potentially may be useable for sensing a broader range of radiation wavelengths. Still another example of a generally well known photoconductor is amorphous silicon, which can include dopants such as phosphorus, nitrogen containing compounds as well as various other dopants that are well known in the art. The addition of various dopants can effectively change the band gap of the amorphous silicon materials, which can allow for spectral flexibility in the range of frequency of radiation that can be used to increase conductivity of the material.

In an embodiment, the chipless RFID transponder 100 includes at least one of an optical filter or a converter (a device or material that absorbs radiation at one wavelength and emits at a different wavelength) disposed over the plurality of resonant structures. Photoconductor materials can have a particular spectral response that limits there use to a particular range of wavelengths. In other cases, photoconductors can be sensitive to a relatively broad range of wavelengths and it may be desirable to have sensitivity to only a particular wavelength in that broader range. By employing filters or converters interposed between the light source and the tag, the range of wavelength to which the transponder is sensitive can be expanded or narrowed as desired. For example, where a photoconductor material is sensitive only to light in the visible spectrum and for a given application it is desired to sense light in the UV, then a converter could be used that absorbs UV radiation and emits radiation in the visible spectrum range at which the photoconductor is sensitive. Such a converter could be used to effectively modify the transponders range so that it is sensitive to UV radiation. In another example, a filter can be employed with a photoconductor material having a broad range of wavelengths in order to effectively narrow the range of wavelengths to which the transponder is sensitive. Any suitable type of optical filter or converter can be employed. As an example, FIG. 2C illustrates a device layer 307 that can represent either an optical filter material or converter material disposed on the resonant structures of the transponder.

The photoconductive material 108 can be disposed in the interstitial regions of any number of the resonant structures 104a-104d. In an embodiment, the photoconductive material 108 is disposed in a plurality of the resonant structures, such as two, three or more of the structures. In an embodiment, photoconductive material 108 is disposed in all of the resonant structures of the chipless RFID transponder 100. While the photoconductive material is active in the interstitial regions of the resonant structures, for ease of manufacturing it can optionally be deposited in other regions of the RFID transponder 100 as well, such as over and around the conductive regions of the resonant structures.

The chipless RFID transponder 100 does not include an internal power source. Rather, it is considered a passive device, deriving its power for transponding information from the reader.

Figure 2A:
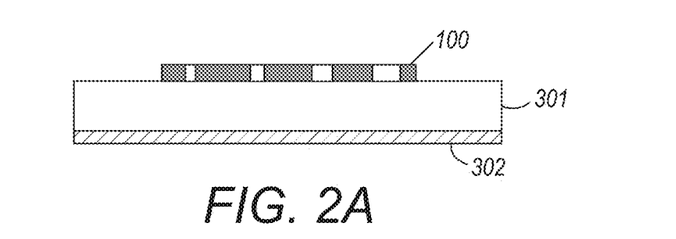
FIG. 2A depicts a side view of a chipless RFID transponder disposed on a carrier, according to an embodiment of the present disclosure.
Figure 3A:
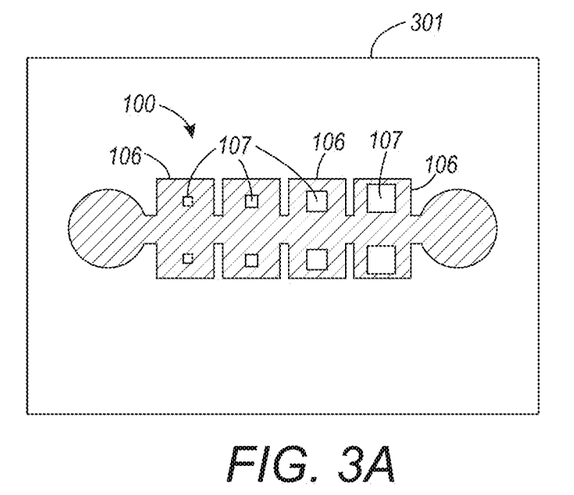
FIG. 3A depicts a top view of the chipless RFID transponder of FIG. 2A, according to an embodiment of the present disclosure.

As shown in FIGS. 2A and 3A, the transponder 100 may be disposed on a carrier 301 such as directly on an article or on an intermediate substrate comprising an optional adhesive backing 302 for attaching onto an article. The carrier 301 may be a substrate on which the RFID transponder is initially fabricated or may be a carrier onto which an RFID transponder is transferred after it is fabricated. A carrier 301 with adhesive backing 302 allows the RFID transponder to be easily attached (i.e., tagged) onto articles.

The RFID transponder 100 may be formed by lithography, etching/stamping or the like. For example, the elements of the RFID transponder responsible for generating the transponder's spectral signature may each or independently be formed as etched structures. RFID transponder 100 may also be a conductive-ink based chipless RFID transponder, wherein all the components, including at least one resonant structure, are formed via patterning of films of conductive material including by printing, such as inkjet printing, a conductive ink.

Figure 2B:
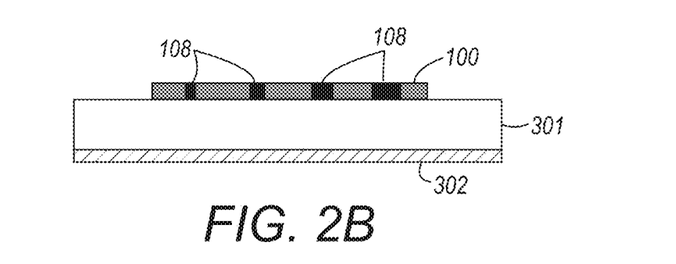
FIG. 2B depicts a side view of the chipless RFID transponder of FIG. 2A including a photoconductor, according to an embodiment of the present disclosure.
Figure 2C:
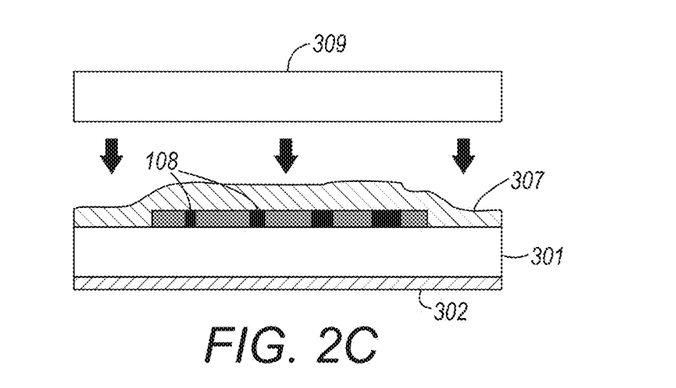
FIG. 2C depicts a side view of a chipless RFID transponder of FIG. 2B including an additional device layer, according to an embodiment of the present disclosure.
Figure 3B:
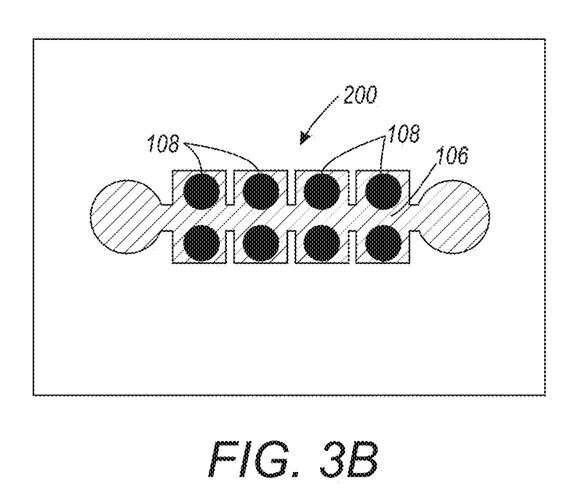
FIG. 3B depicts a top view of the chipless RFID transponder of FIG. 2B, according to an embodiment of the present disclosure.

In an embodiment, the antenna 102,103 and conductive portions 106 of transmitting antenna can be formed by any suitable technique, such as those discussed above. Then the photoconductive material 108 can be deposited in the interstitial spaces 107 between the conductive regions 106, as shown in FIGS. 2B and 3B. Any suitable deposition techniques can be employed. Following deposition of the photoconductive material 108, additional components can be included. For example, as mentioned above and as shown in FIG. 2C, an optical filter or converter 307 can be deposited. Suitable materials and techniques for forming optical filters and converters are well known in the art.

In addition, to prevent unwanted manipulation of the RFID transponder, a security overlayer 309, as shown in FIG. 2C, may be placed over the RFID transponder. In an embodiment, the overlayer 309 is non-conductive and abrasion resistant.

Figure 4:
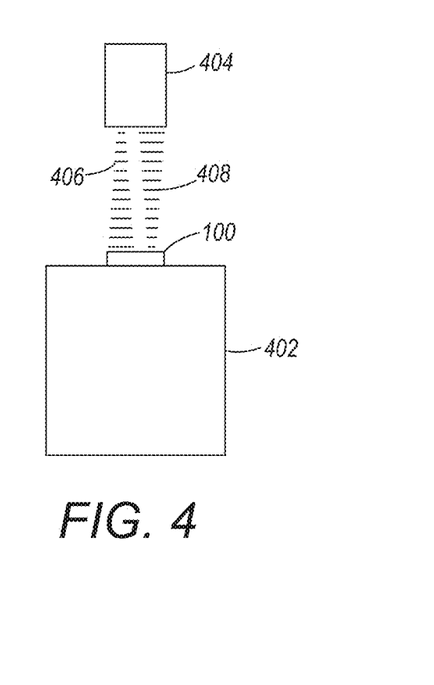
FIG. 4 depicts a schematic view of an interrogator reading a chipless RFID transponder of the present disclosure.

An embodiment of the present disclosure is directed to a method of tracking inventory. The method comprises placing a chipless RFID transponder 100 on an article 402, as shown in FIG. 4. Any of the RFID transponders of the present disclosure can be employed in the method. Thus, the RFID transponder 100 can include antennas 102,103 and a plurality of resonant structures 104a-d that together define a spectral signature of the RFID transponder, as shown in FIG. 1. A photoconductive material 108 is disposed in at least one of the resonant structures. The photoconductive material is positioned so as to shift the spectral signature of the RFID when exposed to radiation.

The method further comprises detecting a spectral response of the at least one RFID transponder 100. The detecting includes employing an interrogator 404 (sometimes referred to herein as a "reader") to administer at least one interrogating pulse 406, the at least one interrogating pulse comprising a spectral range that includes the frequencies over which the resonator structures 104 are tuned. The transponder 100 reflects a signal 408 back to the reader 404 that can be attenuated depending on the resonance effects of the resonant structures 104. Based on the detected spectral response it can be determine whether or not the RFID transponder has been exposed to radiation.

The chipless RFID transponders of the present disclosure can be used in any suitable application that can benefit from an optical sensing device. For example, the chipless RFID transponders can be employed for anti-counterfeiting, anti-tampering and other security purposes, optical data gathering in storage and/or transport of a variety of goods and/or identification purposes and can be used with any desired objects, including, for example, security documents, negotiable instruments such as bank notes, pharmaceuticals, perishable food items, packaging of items that are sensitive to radiation, light sensitive paintings or other products, light sensitive film, inks, and so forth. Moreover, these devices can be used to maintain a radiation exposure history of objects by, for example, routinely reading the RFID tags and collecting and/or storing the gathered data in a memory device.

While the embodiments have been illustrated with respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A chipless RFID transponder, comprising:
   an antenna and a plurality of resonant structures that together define a spectral signature of the RFID transponder, each of the resonant structures comprising conductive portions separated by interstitial regions; and
   a reversible photoconductive material disposed in the interstitial regions of the resonant structures between the conductive portions, the photoconductive material positioned so as to shift the spectral signature of the RFID when exposed to radiation, wherein the photoconductive material has a property of having a first conductivity prior to being exposed to radiation at a specified wavelength and a second conductivity that is different from the first conductivity after being exposed to radiation at the specified wavelength.

2. The chipless RFID transponder of claim 1, wherein the conductive portions of each resonant structure are formed from a continuous segment of electrically conductive material that is coplanar with the interstitial regions.

3. The chipless RFID transponder of claim 1, wherein the photoconductive material is an electrical insulator prior to being exposed to radiation at the specified wavelength.

4. The chipless RFID transponder of claim 1, wherein the second conductivity is higher than the first conductivity.

5. The chipless RFID transponder of claim 1, wherein change in value of the second conductivity relative to the first conductivity is substantially linearly dependent on the intensity of the light to which the photoconductive material is exposed.

6. The chipless RFID transponder of claim 1, wherein the value of the second conductivity is substantially the same as the first conductivity unless the photoconductor is exposed to radiation having a threshold intensity.

7. The chipless RFID transponder of claim 1, further comprising at least one of an optical filter or a converter disposed over the plurality of resonant structures.

8. The chipless RFID transponder of claim 1, wherein the photoconductive material is disposed on a plurality of the resonant structures.

9. The chipless RFID transponder of claim 1, further comprising an adhesive backing on which the RFID transponder is disposed.

10. The chipless RFID transponder of claim 1, further comprising a security overlayer.

11. The chipless RFID transponder of claim 1, wherein the photoconductor is inorganic.

12. The chipless RFID transponder of claim 1, wherein the photoconductor comprises an organic polymer.

13. A method of tracking inventory, comprising:
placing a chipless RFID transponder on an article, the RFID transponder comprising,
an antenna and a plurality of resonant structures that together define a spectral signature of the RFID transponder, each of the resonant structures comprising conductive portions separated by interstitial regions; and
a reversible photoconductive material disposed in the interstitial regions of the resonant structures between the conductive portions, the photoconductive material positioned so as to shift the spectral signature of the RFID when exposed to radiation, wherein the photoconductive material has a property of having a first conductivity prior to being exposed to radiation at a specified wavelength and a second conductivity that is different from the first conductivity after being exposed to radiation at the specified wavelength.

14. The method of claim 13, further comprising detecting a spectral response of the at least one RFID transponder.

15. The method of claim 14, further comprising determining if the RFID transponder has been exposed to radiation based on the detected spectral response.

16. The method of claim 14, wherein the detecting comprises administering at least one interrogating pulse emitted by an interrogator, the at least one interrogating pulse comprising a spectral range.

17. The method of claim 14, wherein the conductive portions of each resonant structure are formed from a continuous segment of electrically conductive material that is coplanar with the interstitial regions.

18. A chipless RFID transponder, comprising:
an antenna and a plurality of resonant structures that together define a spectral signature of the RFID transponder, each of the resonant structures comprising conductive portions separated by interstitial regions; and
a reversible photoconductive material disposed in the interstitial regions of two or more of the resonant structures, the photoconductive material positioned so as to shift the spectral signature of the RFID when exposed to radiation, wherein the photoconductive material has a property of having a first conductivity prior to being exposed to radiation at a specified wavelength and a second conductivity that is different from the first conductivity after being exposed to radiation at the specified wavelength.

19. The chipless RFID transponder of claim 1, wherein the resonant structures are spiral resonators.

20. The chipless RFID transponder of claim 1, wherein the reversible photoconductor material is selected from the group consisting of selenium, tellurium, selenium tellurium, titanium dioxide, arsenic triselenide and doped amorphous silicon.

* * * * *